United States Patent
Lee et al.

(10) Patent No.: US 6,259,669 B1
(45) Date of Patent: Jul. 10, 2001

(54) TECHNIQUE FOR REDUCING CROSS ERASURE IN AN OPTICAL DISC RECORDING APPARATUS

(75) Inventors: Kyung-Geun Lee, Sungnam; Du-Seop Yoon, Suwon, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/277,957

(22) Filed: Mar. 29, 1999

(30) Foreign Application Priority Data

Mar. 27, 1998 (KR) .............................. 1998-10795
Jan. 20, 1999 (KR) ................................ 1999-1644

(51) Int. Cl.$^7$ ........................................... G11B 7/00
(52) U.S. Cl. ................. 369/116; 369/54; 369/47
(58) Field of Search ................. 369/47, 48, 49, 369/50, 54, 58, 59, 116

(56) References Cited

U.S. PATENT DOCUMENTS 5,448,551 * 9/1995 Miyagawa et al. ............. 369/116 X
5,848,045 * 12/1998 Kirino et al. ..................... 369/116

FOREIGN PATENT DOCUMENTS 6-290460    10/1994  (JP) .
10-208246    8/1998  (JP) .
10-289461   10/1998  (JP) .

* cited by examiner

*Primary Examiner*—Muhammad Edun
(74) *Attorney, Agent, or Firm*—Robert E. Bushnell, Esq.

(57) ABSTRACT

In an optical disc recording technique for reducing cross erasure by controlling the power of a laser upon rewriting in a disc recording and reproducing method, the power of a laser is lowered to or below a reproduction power, and recording takes place at a portion where nonoverwritten and overwritten erasing portions overlap each other. Therefore, the cross erasure affecting a signal on adjacent tracks can be reduced by a thermal effect upon recording, and the cyclability on an overwriting track can be improved as well.

13 Claims, 7 Drawing Sheets

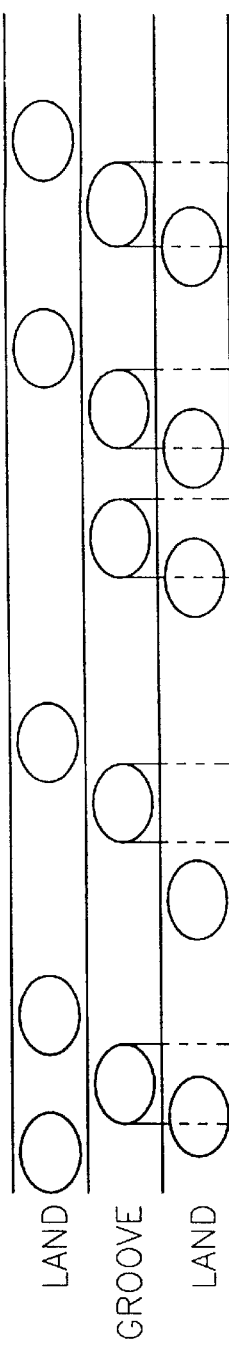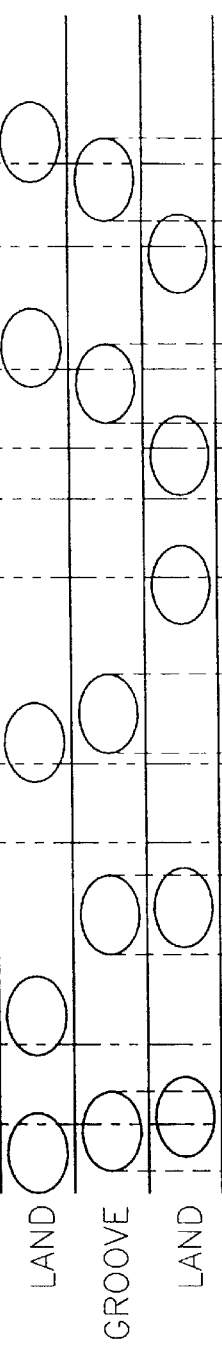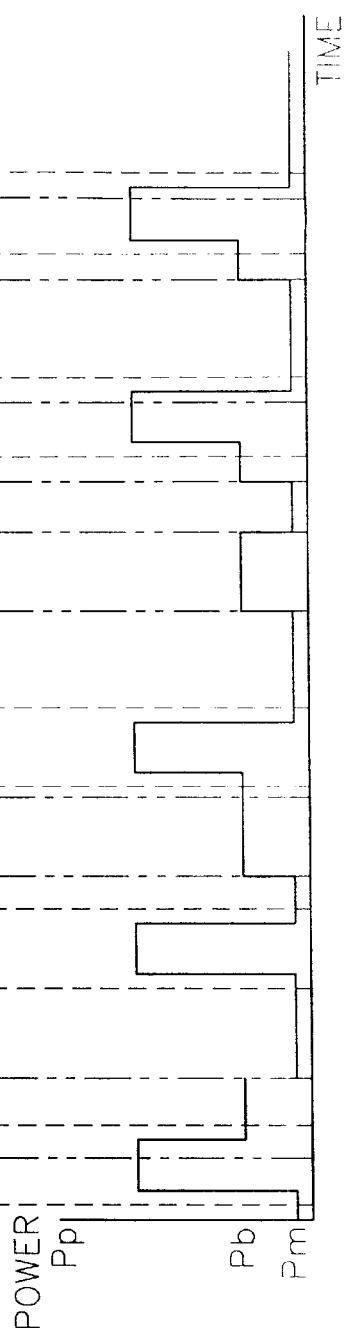
FIG. 6A
FIG. 6B
FIG. 6C

TECHNIQUE FOR REDUCING CROSS ERASURE IN AN OPTICAL DISC RECORDING APPARATUS

CLAIM OF PRIORITY

This application makes reference to, incorporates the same herein, and claims all benefits accruing under 35 U.S.C. §119 from applications for OPTICAL DISC RECORDING APPARATUS AND METHOD FOR IMPROVING THE CHARACTERSTICS OF CROSS ERASURE earlier filed in the Korean Industrial Property Office on the Mar. 27, 1998 and there duly assigned Ser. No. 10795/1998, and for OPTICAL DISC RECORDING APPARATUS AND METHOD FOR IMPROVING THE CHARACTERISTICS OF CROSS ERASURE earlier filed in the Korean Industrial Property Office on the Jan. 20, 1999 and there duly assigned Ser. No. 1644/1999.

BACKGROUND OF THE INVENTION

1. Field of the Invention

The present invention relates to an optical disc recording technique, and more particularly, to a technique for reducing cross erasure in an optical disc recording apparatus by controlling the laser power during rewriting in a land/groove recording and reproducing technique.

2. Description of the Related Art

An optical disc, used as a noncontact information recording medium in an optical disc player, has been developed for high capacity, high speed, and high density recording with advancements in the information field. In particular, an optical disc capable of recording/reproducing high density information, such as a digital versatile disc (DVD), a random access memory (RAM), etc., has been actively developed in association with the recording/reproduction of image information in a multimedia PC or a high quality TV. Thus, a high-density optical disc medium having an improved capacity must be developed to handle the next generation multimedia market.

The recording density per unit area must be increased to manufacture a high-density optical disc. The recording density can be increased by reducing the size of a laser spot. The size of the laser spot is proportional to the wavelength $\lambda$ of a light beam and inversely proportional to the numerical aperture. Hence, in order to reduce the size of the laser spot, the wavelength of the beam must be reduced, or an objective lens having a high numerical aperture must be used.

The interval between the tracks of a high-density optical disc is gradually decreasing through the use of these methods.

An optical disc capable of recording information on lands and grooves formed thereon has already been proposed as an alternative to increasing the recording density within a limited recording area on an optical disc.

Typically, such an optical disc has a plurality of tracks formed from the inner circumference toward the edge of the disc in a spiral. Grooves are formed to predetermined depths on each track, and lands are formed to the surface height of the disc thereon. These lands and grooves alternate between adjacent tracks. A mark representing data information is formed on the lands and grooves by the power of a laser corresponding to a recording pulse pattern.

In a disc drive using this high-density optical disc as a recording medium, a recording pulse pattern depending on the recording states of nonoverwritten and overwritten tracks is represented as a record peak power and an erase power. However, for such a recording pattern, all domains with recording and erasing power are heated during overwriting. Thus, in the case of the land/groove recording method, e.g., when data is recorded in the grooves, cross erasure occurs, in which data recorded between adjacent lands is erased by generated heat, even in the recording section of a portion where nonoverwritten and overwritten erasing areas overlap each other. Therefore, the reliability of data between adjacent tracks is degraded.

SUMMARY OF THE INVENTION

To solve the above problem, it is an objective of the present invention to provide an optical disc recording apparatus for reducing cross erasure by generating less than a reproduction power, when an erasing portion before overwriting overlaps an erased portion during overwriting.

Accordingly, to achieve the above objective, there is provided an optical disc recording apparatus for reducing cross erasure when recording on an optical disc capable of being overwritten, the apparatus comprising: a pickup having a laser; a recording/reproduction signal processing unit; a servo unit; and a control unit. The control unit comprises: a control signal generator for comparing a reproduction signal, reproduced from a recording track in the recording/reproduction signal processing unit in a recording mode, with a modulated recording signal to be recorded, and generating a first control signal when only the reproduction signal has a recording mark, a second control signal when neither the reproduction signal nor the modulated recording signal have the recording mark, and a third control signal when only the modulated recording signal has the recording mark; and a laser pulse controller for controlling the power of the laser so that the laser generates power at a first erasing level when the first control signal is supplied, generates power at a second erasing level lower than the first erasing level when the second control signal is supplied, and generates a predetermined multi pulse power when the third control signal is supplied.

To achieve the above objective, there is also provided an optical disc recording method for reducing cross erasure when recording on a recordable/reproducible phase changing optical disc using laser power, the method comprising the steps of: (a) determining whether the optical disc drive is in a recording mode; (b) determining whether erasing areas overlap each other by comparing a pattern recorded on a recording track with a pattern to be recorded when it is determined in step (a) that the optical disc drive is in the recording mode; and (c) controlling the laser to generate a first predetermined erasing power when it is determined in step (b) that the pattern to be recorded is the erasing area and the recorded pattern is an area having a recording mark, and to generate a second erasing power that is lower than the first erasing power when both the pattern to be recorded and the recorded pattern are the erasing area.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6A shows marks recorded on a nonoverwritten track in a pit position recording method according to the present invention;

FIG. 6B shows marks recorded on an overwritten track in the pit position recording method according to the present invention;

FIG. 6C shows a recording pulse pattern in the pit position recording method according to the present invention;

DESCRIPTION OF THE PREFERRED EMBODIMENT

An optical disc recording apparatus for reducing cross erasure, according to the present invention, will now be described.

Figure 1:
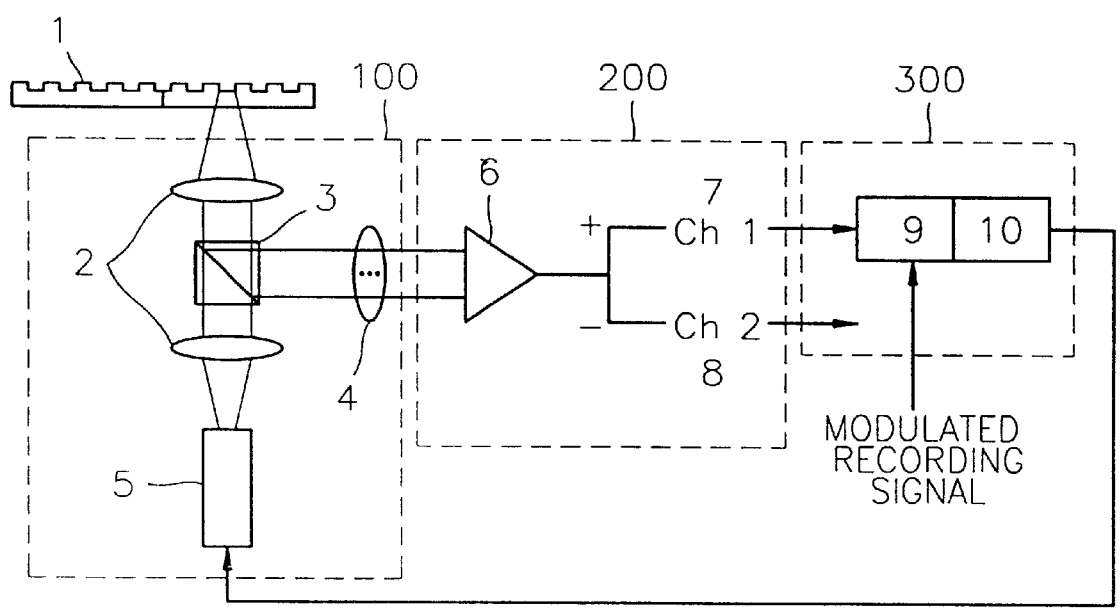
FIG. 1 is a block diagram illustrating the structure of an optical disc recording apparatus for reducing cross erasure according to the present invention.

As shown in FIG. 1, the optical disc recording device according to the present invention is comprised of a pickup 100, a recording/reproduction signal processing unit 200, and a control unit 300.

The pickup 100 is comprised of an objective lens 2, a beam splitter 3, a photodetector 4, and a laser 5. The recording/reproduction signal processing unit 200 includes an operation circuit 6, and channel 1 and 2 processors 7 and 8 including a well-known digital signal processor (DSP; not shown). The control unit 300 includes a control signal generator 9 and a laser pulse controller 10.

A track to be recorded on a disc 1 in a record mode is searched, and light generated by a laser 5 is then output to the disc 1 via the objective lens 2 and the beam splitter 3. Then, light reflected by the disc 1 is input to the photodetector 4 via the beam splitter 3.

The photodetector 4 converts an input optical signal into an electrical signal.

The operation circuit 6 generates a signal to be used for signal processing and a signal to be used for servo control from the electrical signal. The signal processing signal is output to the channel 1 processor 7, and the control signals such as a tracking control signal and a focusing control signal are output to the channel 2 processor 8.

The channel 1 processor 7 amplifies, equalizes, and decodes the received signal and outputs the processed signal to the control signal generator 9.

The control signal generator 9 receives a reproduction signal input via the channel 1 processor 7 and a modulated recording signal, determines whether the input signals correspond to an area on which a recording mark has been formed or an area on which a recording mark has not been formed, and generates recording control signals.

Figure 2:
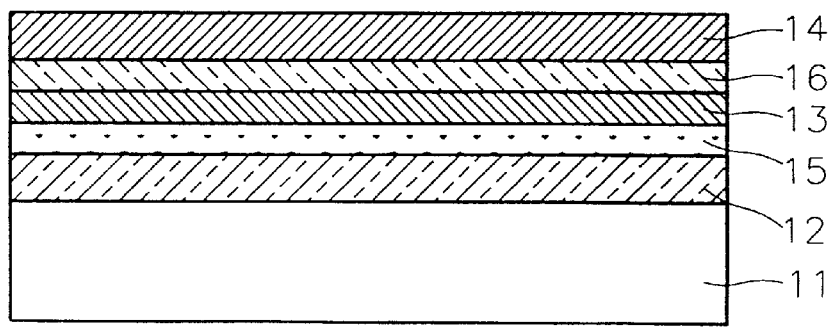
FIG. 2 is a cross-sectional view of the configuration of a phase changing optical disc.

FIG. 2 is a cross-sectional view of an optical disc formed by sequentially depositing a lower dielectric layer 12, a recording layer 15, an upper dielectric layer 13, a second reflecting layer 16, and a first reflecting layer 14 on a substrate 11.

Figure 3A:
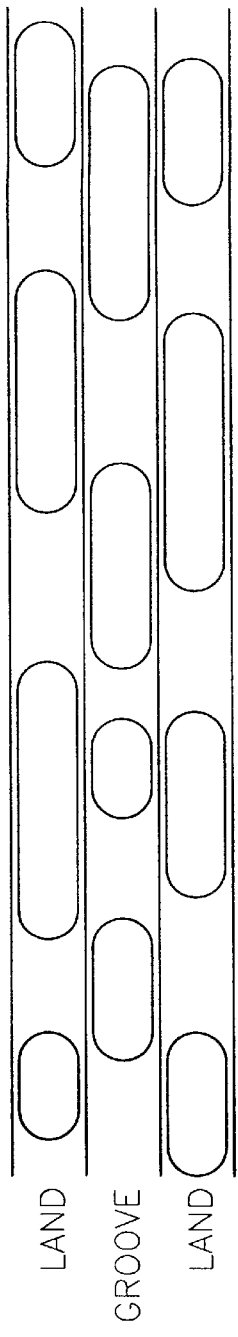
FIG. 3A shows marks recorded on a nonoverwritten track in a mark edge recording method.
Figure 3B:
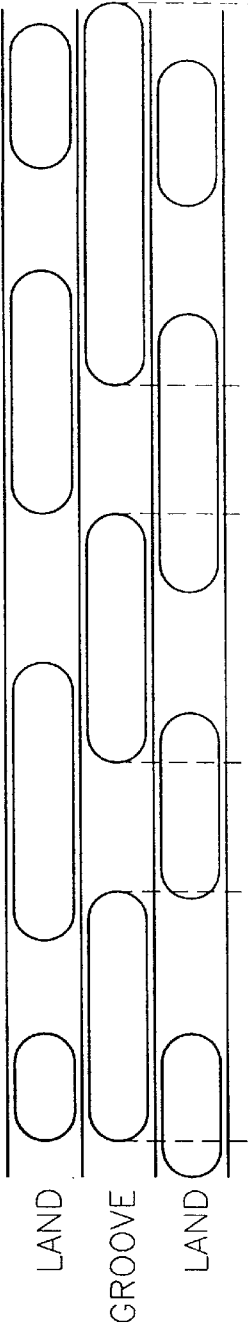
FIG. 3B shows marks recorded on an overwritten track in the mark edge recording method.
Figure 3C:
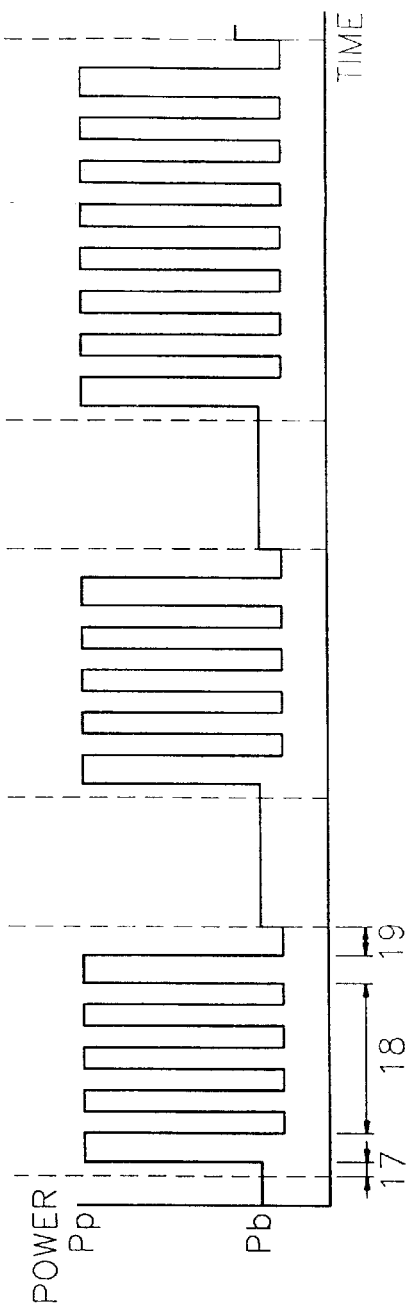
FIG. 3C shows a recording pulse pattern in the mark edge recording method.

FIG. 3A shows marks recorded on a nonoverwritten track in a mark edge recording method as discussed in the Description of the Related Art above, while FIG. 3B shows marks recorded on an overwritten track in the same method discussed in the Description of the Related Art above, and FIG. 3C shows a recording pulse pattern in the same mark edge recording method.

Figure 5A:
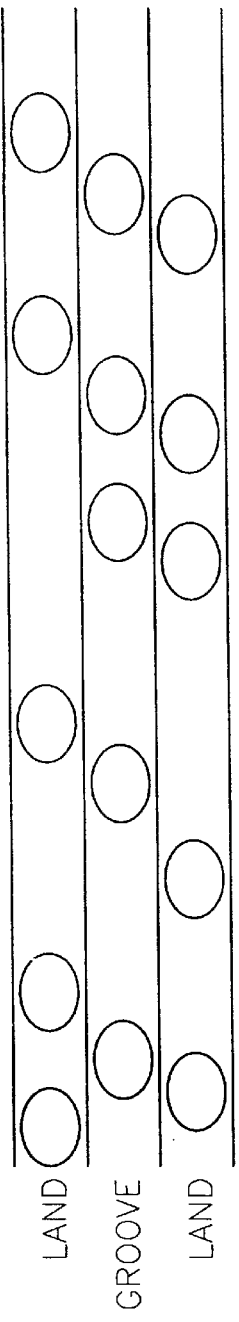
FIG. 5A shows marks recorded on a nonoverwritten track in a pit position recording method.
Figure 5B:
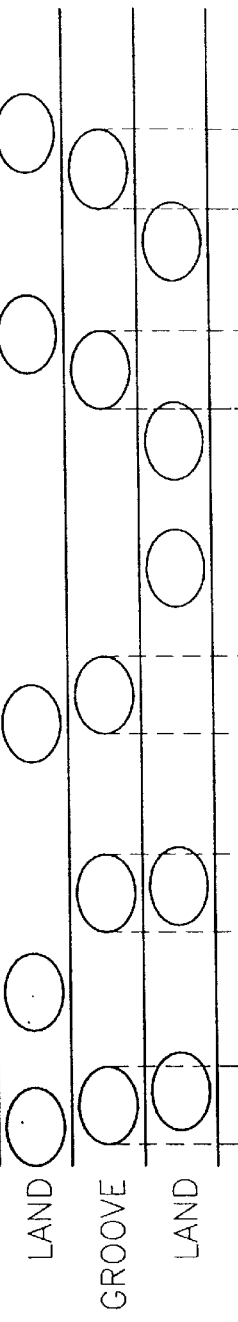
FIG. 5B shows marks recorded on an overwritten track in the pit position recording method.
Figure 5C:
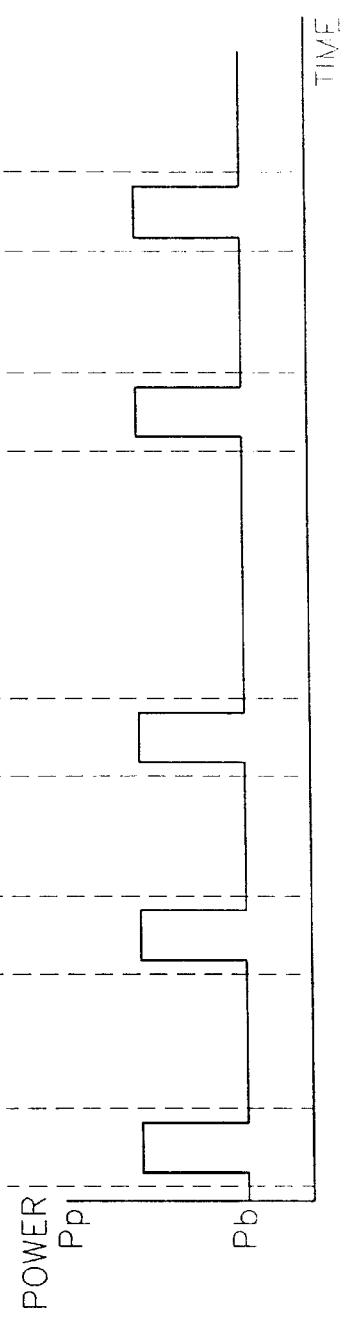
FIG. 5C shows a recording pulse pattern in the pit position recording method.

FIG. 5A shows marks recorded on a nonoverwritten track in a pit position recording method as discussed in the Description of the Related Art above, while FIG. 5B shows marks recorded on an overwritten track in the same pit position recording method, and FIG. 5C shows a recording pulse pattern in the same pit position recording method.

In the case of using a mark edge recording method as a recording method, a recording power controlling method according to the present invention will now be described referring to FIGS. 4A through 4C.

Figure 4A:
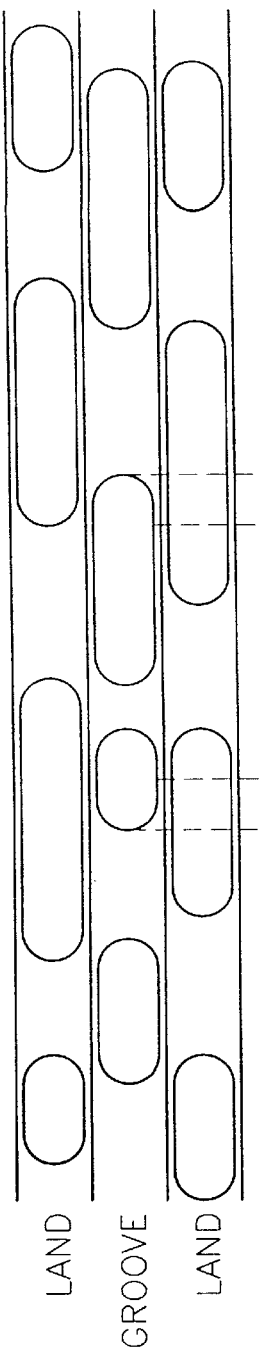
FIG. 4A shows marks recorded on a nonoverwritten track in a mark edge recording method according to the present invention.

The recording state of an overwritten disc is shown in FIG. 4A, and it is assumed that a track to be recorded is a groove being a central track.

Figure 4B:
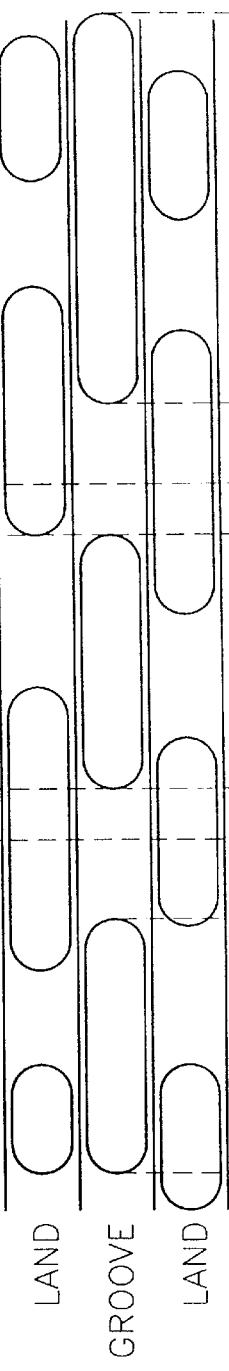
FIG. 4B shows marks recorded on an overwritten track in the mark edge recording method according to the present invention.

In this case, if the state of a pattern to be recorded on an overwritten disc is as shown in FIG. 4B, the control signal generator 9 compares the reproduction signal with the recording signal and generates first, second, and third control signals. The second control signal for allowing generation of a recording pattern having less than a reproduction power is generated when an erased portion before overwriting overlaps an erasing portion during overwriting, i.e., in a section (a) of FIG. 4C. The first control signal is generated when a recording mark exists only in the reproduction signal not in the recording signal, i.e., in a section (b) of FIG. 4C. The third control signal is generated when the recording signal has a recording mark.

Then, the laser pulse controller 10 controls the power of the laser 5 according to the control signals generated by the control signal generator 9.

Figure 4C:
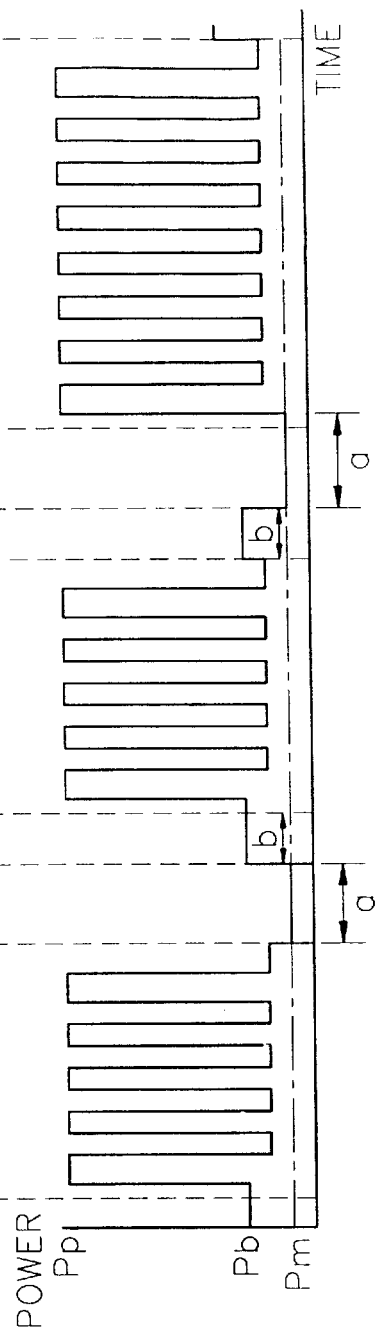
FIG. 4C shows a recording pulse pattern in the mark edge recording method according to the present invention.

That is, when the first control signal is supplied, it controls a first erasing level power Pb, shown in FIG. 4C, to be generated by the laser 5. When the second control signal is supplied, it controls a second erasing level power Pm, shown in FIG. 4C, to be generated by the laser 5. When the third control signal is supplied, it controls a multi pulse for forming a recording mark to be generated by the laser 5.

If the second erasing level power Pm is set to be less than a reproduction power, a thermal effect is not exerted on adjacent tracks upon overwriting at a portion where the erased portion before overwriting overlaps the erasing portion during overwriting.

Thus, the second erasing level power Pm with less than the reproduction power is generated from the portion where the nonoverwritten and overwritten erased portions overlap each other, and is converted into the first erasing level power Pb by the first control signal when it reaches the previous recorded mark portion during recording.

Hereinafter, an optical disc recording method for reducing cross erasure according to the present invention will be described.

Figure 7:
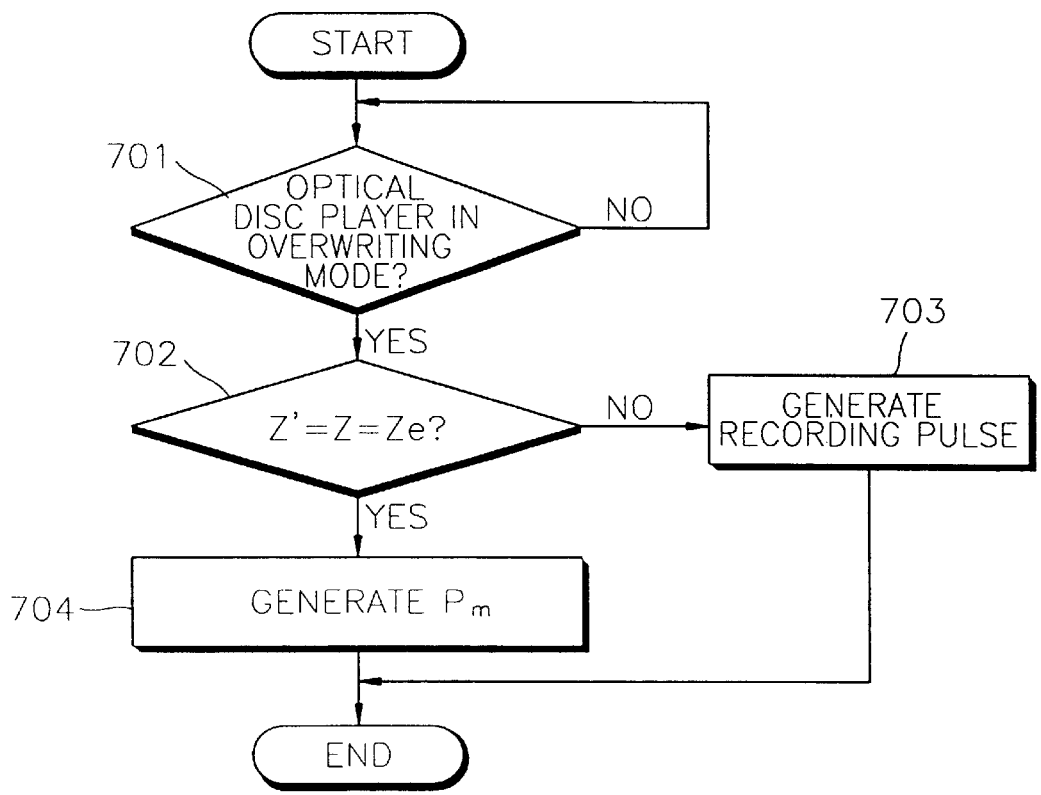
FIG. 7 is a flowchart illustrating an optical disc recording method for reducing cross erasure according to the present invention.

FIG. 7 is a flowchart illustrating the control operation of the control unit 300 shown in FIG. 1.

In step 701, it is determined whether an optical disc player is in an overwriting mode (recording mode).

In step 702, when the optical disc player is in the overwriting mode, it is determined whether both a pattern Z' recorded on a track, and a pattern Z to be recorded thereon, exist on an erasing area Ze.

In step 703, when both the recorded pattern and the pattern to be recorded in the overwriting mode do not exist in the erasing area (Ze), a multi pulse is generated from a portion, where a recording mark exists, of a recording pattern to be overwritten. Also, the first erasing power Pb is generated from a portion of a nonoverwritten recording pattern where the recording mark exists and from a portion of a recording pattern to-be-written where no recording mark exists.

In step 704, when it is determined in step 702 that both the recorded pattern and the pattern to be recorded in the overwriting mode do exist in the erasing area (Ze), a second erasing power Pm having a lower level than the first erasing power Pb is generated.

Here, it is preferable that the magnitude of the second erasing power Pm be between 0mW and a reproduction power to prevent a thermal effect from being exerted on adjacent tracks.

Figure 8:
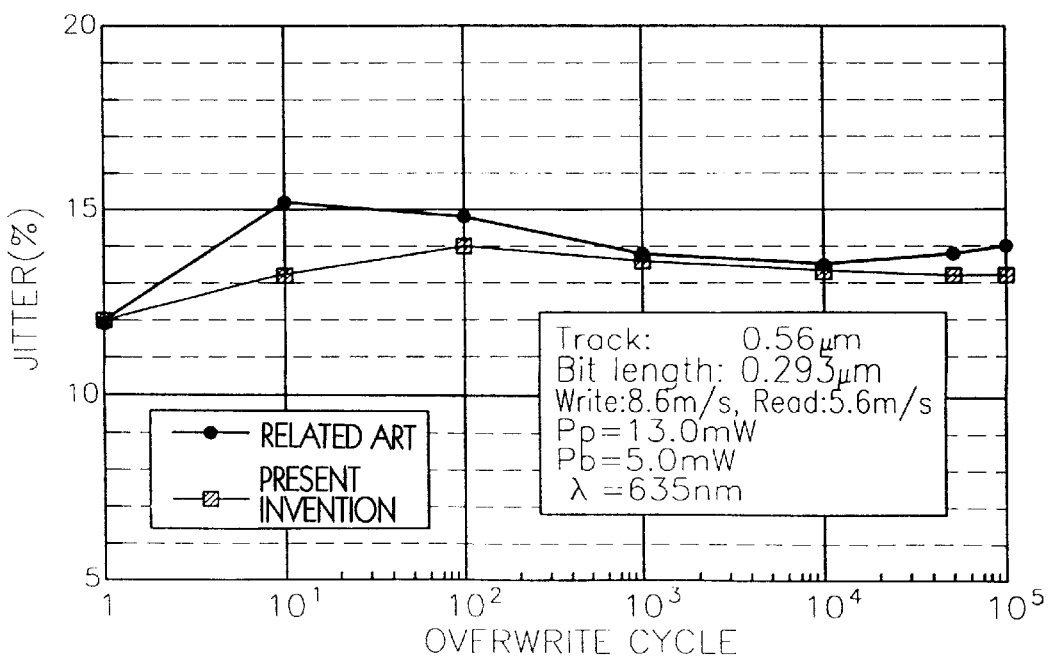
FIG. 8 is a graph showing the characteristics of jitter varying with an overwriting cycle according to a mark edge recording method.

In order to ascertain such an effect, according to the present invention, the cross erasure characteristics and overwriting jitter according to the related art and the present invention are measured using the recording patterns of FIGS. 3A–3C and 4A–4C according to a mark edge recording method. The measured results are shown in FIG. 8. Here, the measurement conditions are as follows: a wavelength of 635 nm, a track pitch of 0.56 µm, a minimum bit length of 0.293 µm, a recording speed of 8.6 m/s, a reproducing speed of 5.6 m/s, a maximum recording power Pp of 13.0 mW, a first erasing power Pb of 5.0 mW, and a second erasing power Pm of 0.2 mW.

Figure 9:
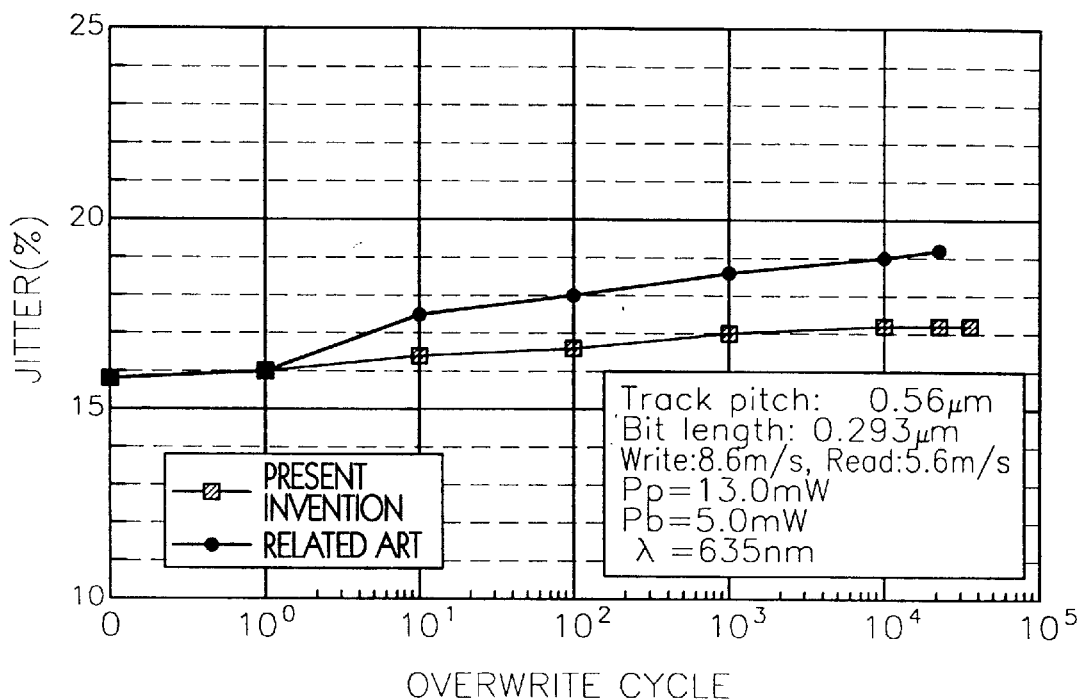
FIG. 9 is a graph showing the characteristics of cross erasure jitter varying with an overwriting cycle according to a mark edge recording method.

In particular, in the cross erasure measurement, an initial jitter value (indicated as a zero cycle in a graph) of an area to be measured is measured as a 10-times overwriting value, and is affected by the overwriting in both lands upon measurement in the groove area. The results of the cross erasure measurement are shown in FIG. 9. Referring to FIG. 9, it becomes evident that the present invention is about 1% superior to the related art at $10^5$ cycle in overwriting cyclability and about 2% superior thereto at $10^4$ cycle in cross erasure. This means that, in the present invention, an area exposed at the second erasing power (Pm) has a small thermal effect on a groove (or land) existing on adjacent tracks compared to the prior art.

Several nsec are required for the power conversion according to an erasing power controlling method of the present invention, so that a residual recording signal can be detected. However, upon recording with a speed of 8.6 m/s, which is greater than that of a first generation DVD-RAM standard, a ½Tw due to a multi pulse is 8.5 nsec, so that only a tiny number of signals are not completely removed for the time accompanied by the power conversion, compared to the case of a minimum recording mark 3Tw. As described above, an area written at a reproduction power or below has no thermal effect, so that the cross erasure phenomenon of erasing a signal on adjacent tracks can be improved, and the cyclability in an area currently in writing can also be increased.

Nevertheless, when the present invention is applied to a mark edge recording method, an absolute jitter value depending on overwriting is 13% at 10 cycle and 14% at 100 cycle, so that it continuously keeps a high value which can generate a data error.

The maintenance of the high value can be considered to be affected by residual erasing due to a time delay caused when the erasing power is changed from a Pm level to a Pb level.

In order to reduce the influence of residual erasing according to this mark edge recording method, the present invention is applied to the pit position recording method of FIGS. 6A through 6C, so that the cross erasure and the overwriting cyclability are better improved.

That is, in the pit position recording method, when the recording pattern according to the related art is used, it is recorded at an identical erasing power between pits regardless of the state of a nonoverwritten pattern as shown in FIGS. 5A through 5C. However, in the pit position recording method, when the recording pattern according to the present invention is used, the recorded state before recording is detected, and an erasing power level is changed according to the detected recorded state, as shown in FIGS. 6A through 6C. In this way, the erasing area according to the pit position recording method is longer than that according to the mark edge recording method shown in FIGS. 4A through 4C, so that the cross erasure phenomenon can be remarkably improved. In addition, even when residual recording signals exist, an error generation rate can be lowered by the detection of a mark position upon the reproduction of data.

Figure 10:
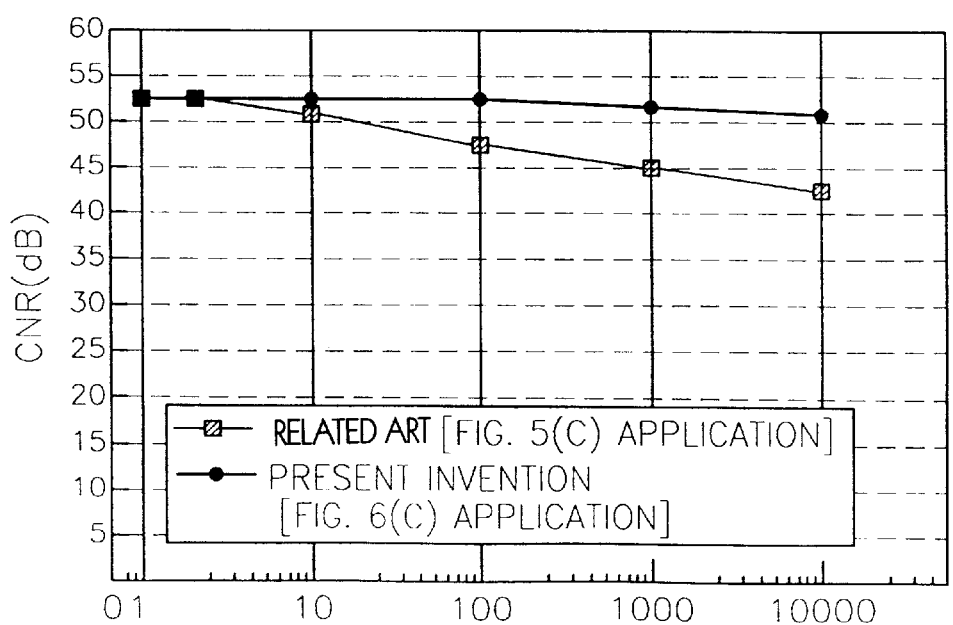
FIG. 10 is a graph showing the characteristics of CNR varying with an overwriting cyclability according to a pit position recording method.

As shown in FIG. 10, it becomes evident that the CNR characteristics, depending on the overwriting cyclability, are improved when the recording method according to the present invention is applied to a pit position recording method.

As described above, when a laser power controlling apparatus and method of generating less than a reproduction power at a portion where nonoverwritten and overwritten erased portions according to the present invention overlap each other is applied to the mark edge recording method and the pit position recording method, the cross erasure characteristics is improved, and jitter depending on the cyclability is also improved compared to the related art.

In particular, it becomes evident that the cross erasure characteristics and the jitter depending on the cyclability are more remarkably improved in the pit position recording method according to the present invention than in the mark edge recording method.

The optical disc recording apparatus and method for reducing cross erasure according to the present invention is not limited to the mark edge recording method and the pit position recording method of an optical magnetic disc drive adopted in the embodiment of the present invention. It is apparent to those skilled in the art that the optical disc recording apparatus and method according to the present invention can be applied to all kinds of recording methods using laser power.

What is claimed is:

1. An optical disc recording apparatus for recording on an optical disc drive capable of being overwritten, the apparatus comprising:

a pickup having a laser;

a recording/reproduction signal processing unit;

a servo unit;

a control signal generator for comparing a reproduction signal reproduced from a recording track in the recording/reproduction signal processing unit in a recording mode with a modulated recording signal to be recorded, and for generating a first control signal when only the reproduction signal has a recording mark, a second control signal when neither the reproduction signal nor the modulated recording signal have the recording mark, and a third control signal when only the modulated recording signal has the recording mark; and a laser pulse controller for controlling the power of the laser so that the laser generates power at a first erasing level when the first control signal is supplied, generates a power at a second erasing level lower than the first erasing level when the second control signal is supplied, and generates a predetermined multi pulse power when the third control signal is supplied.

2. The optical disc recording apparatus as claimed in claim 1, the optical disc drive recording apparatus recording using a mark edge recording method.

3. The optical disc recording apparatus as claimed in claim 1, the optical disc drive recording apparatus recording using a pit position recording method.

4. The optical disc recording apparatus as claimed in claim 1, the power of the second erasing level being set to be between OmW and a reproduction power.

5. An optical disc recording method for recording on a recordable/reproducible optical disc using a laser power, the method comprising the steps of:

(a) determining whether the optical disc drive is in a recording mode;

(b) determining whether erasing areas overlap each other by comparing a pattern recorded on a recording track with a pattern to be recorded when it is determined in step (a) that the optical disc drive is in the recording mode; and (c) controlling the laser to generate a first erasing power when it is determined in step (b) that the pattern to be recorded is the erasing area and the recorded pattern is an area having a recording mark, and to generate a second erasing power that is lower than the first erasing power when both the pattern to be recorded and the recorded pattern are the erasing area.

6. The optical disc recording method as claimed in claim 5, the recording method being a mark edge recording method.

7. The optical disc recording method as claimed in claim 5, the recording method being a pit position recording method.

8. The optical disc recording method as claimed in claim 5, the power of the second erasing level in step (c) being set to be between 0 mW and a reproduction power.

9. The optical disk recording apparatus as claimed in claim 1, wherein the power at the second erasing level is less than a reproduction power.

10. The optical disk recording apparatus as claimed in claim 1, wherein the predetermined multi pulse is controlled for forming the recording mark.

11. The optical disk recording apparatus as claimed in claim 5, wherein the second erasing power is lower than a reproduction power.

12. The optical disk recording apparatus as claimed in 5, wherein step (c) further comprises controlling the laser to generate a predetermined multi pulse power when it is determined in step (b) that the recorded pattern is the erasing area and the pattern to be recorded is the area having the recording mark.

13. The optical disk recording apparatus as claimed in claim 12, wherein the predetermined multi pulse is controlled for forming the recording mark.

* * * * *